United States Patent
Johnson

[15] 3,656,569
[45] Apr. 18, 1972

[54] WEIGHING APPARATUS

[72] Inventor: Clarence Johnson, 31649 Trillium Trail, Pepper Pike, Cleveland, Ohio 44124

[22] Filed: Sept. 22, 1970

[21] Appl. No.: 74,300

[52] U.S. Cl................................177/210, 177/211, 177/226, 177/229, 177/255
[51] Int. Cl......................G01g 3/08, G01g 3/12, G01g 3/18
[58] Field of Search...................177/210, 211, 229, 255, 164, 177/225–228

[56] References Cited

UNITED STATES PATENTS

| | | | |
|---|---|---|---|
| 3,080,936 | 3/1963 | Sher et al. | 177/229 X |
| 3,137,358 | 6/1964 | Jungmayr | 177/229 UX |
| 3,142,349 | 7/1964 | Blodgett | 177/164 |
| 3,373,830 | 3/1968 | Thomson | 177/229 X |
| 3,494,435 | 2/1970 | Rouban | 177/255 X |

Primary Examiner—Robert S. Ward, Jr.
Attorney—Strauch, Nolan, Neale, Nies & Kurz

[57] ABSTRACT

A cantilevered flexure spring weighing apparatus in which a load-receiving structure is supported on the free ends of upper and lower, vertically spaced apart, cantilever mounted flexure spring members. The flexure members, which are flexed by the applied load to provide a weight-representing deflection of the load-receiving structure, are respectively placed in tension and compression when the load is off center whereby a structure rigidly interconnecting the free flexure member ends is turned slightly about an axis relative to a relatively stationary support that mounts the flexure members. A transducer having coacting relatively movable, signal producing parts respectively connected to the interconnecting structure and the flexure member support, measures the weight representing deflection at a location that is at least closely adjacent to a predetermined center of integrity where the relative angular displacement of the interconnecting structure does not impart any significant signal producing relative motion to the coacting transducer parts. Other features of this invention pertain to a tare adjustment and a temperature compensating construction, among other things.

19 Claims, 13 Drawing Figures

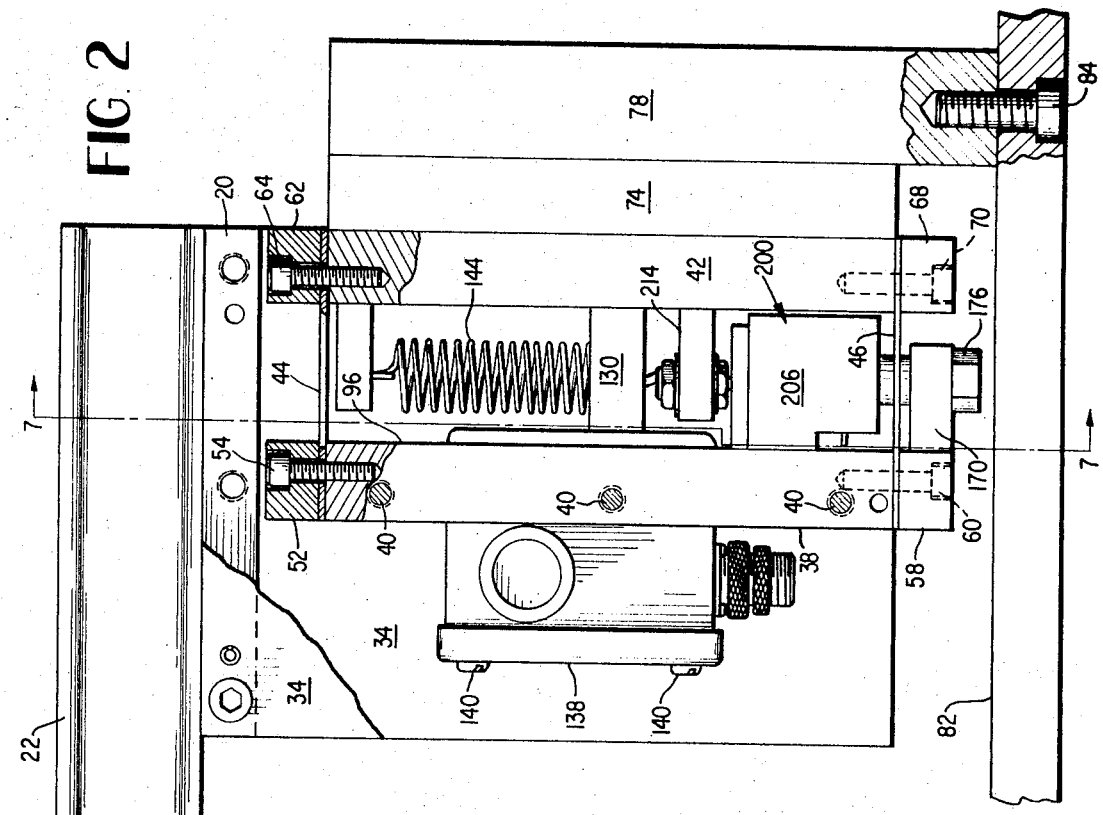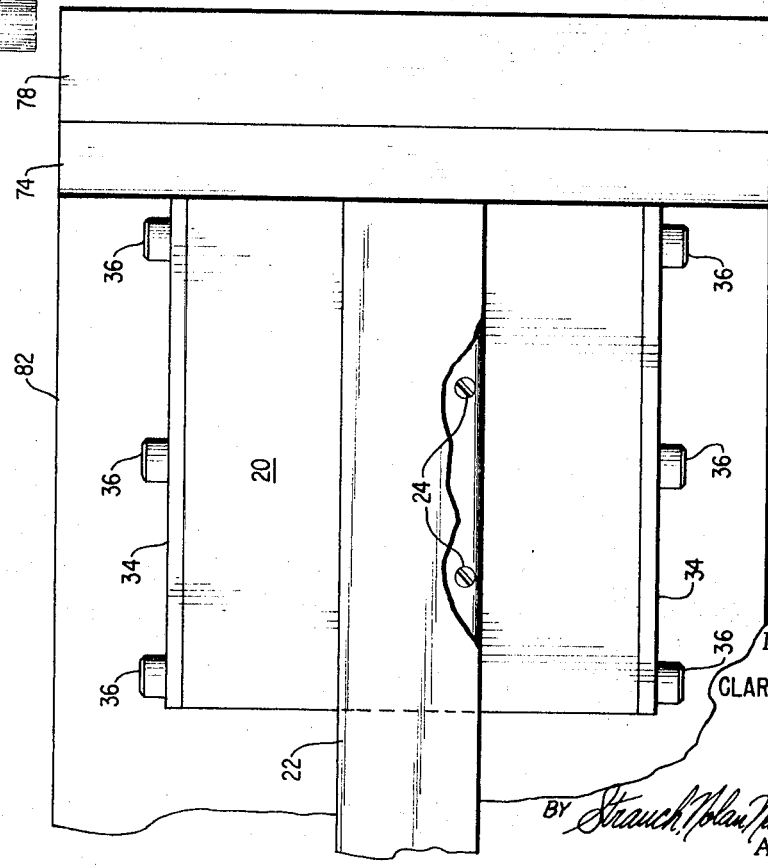

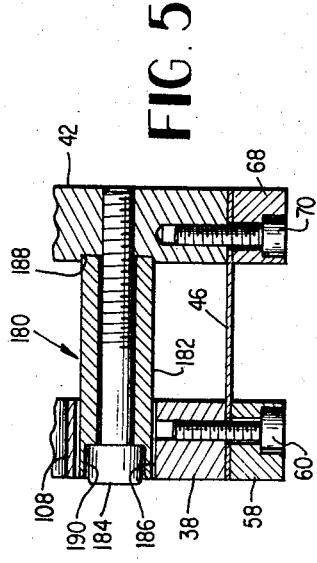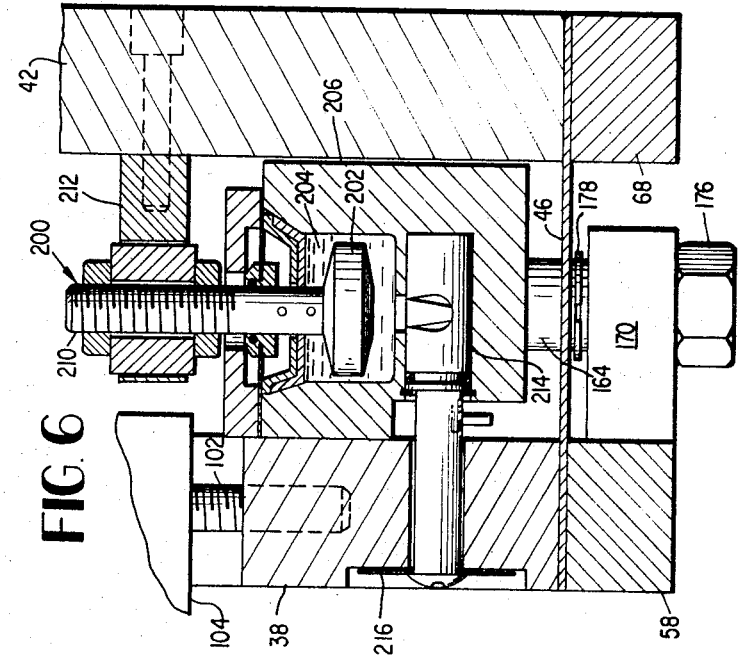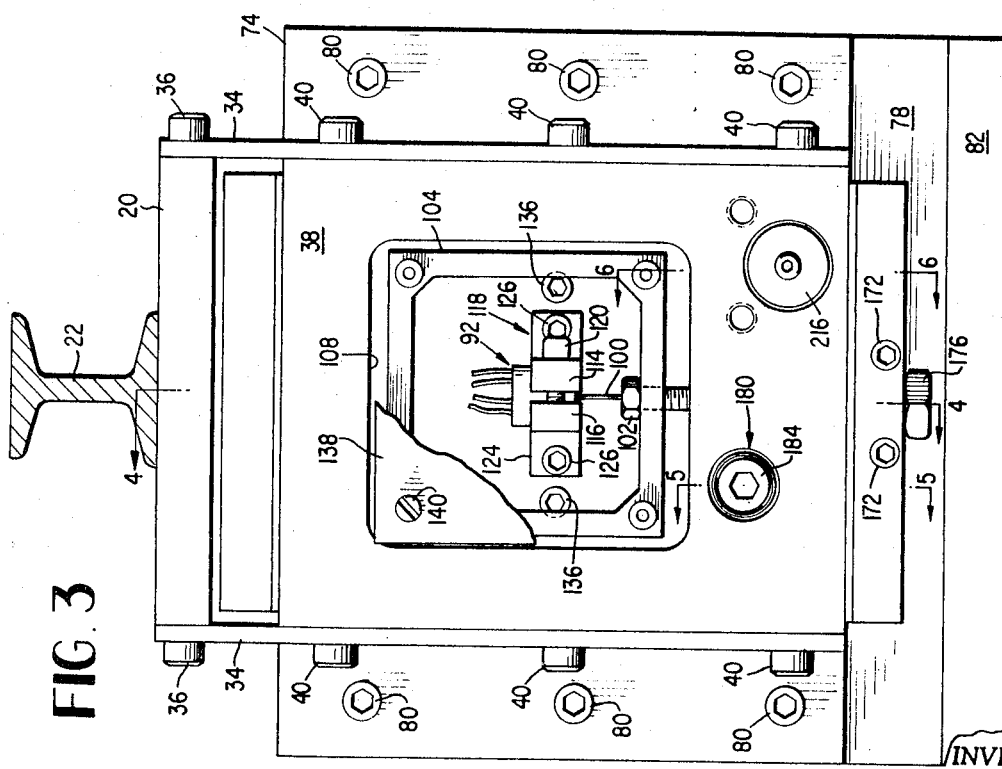

INVENTOR
CLARENCE JOHNSON

INVENTOR
CLARENCE JOHNSON

PATENTED APR 18 1972

INVENTOR
CLARENCE JOHNSON

BY Strauch, Nolan, Neale, Nies & Kurz
ATTORNEYS

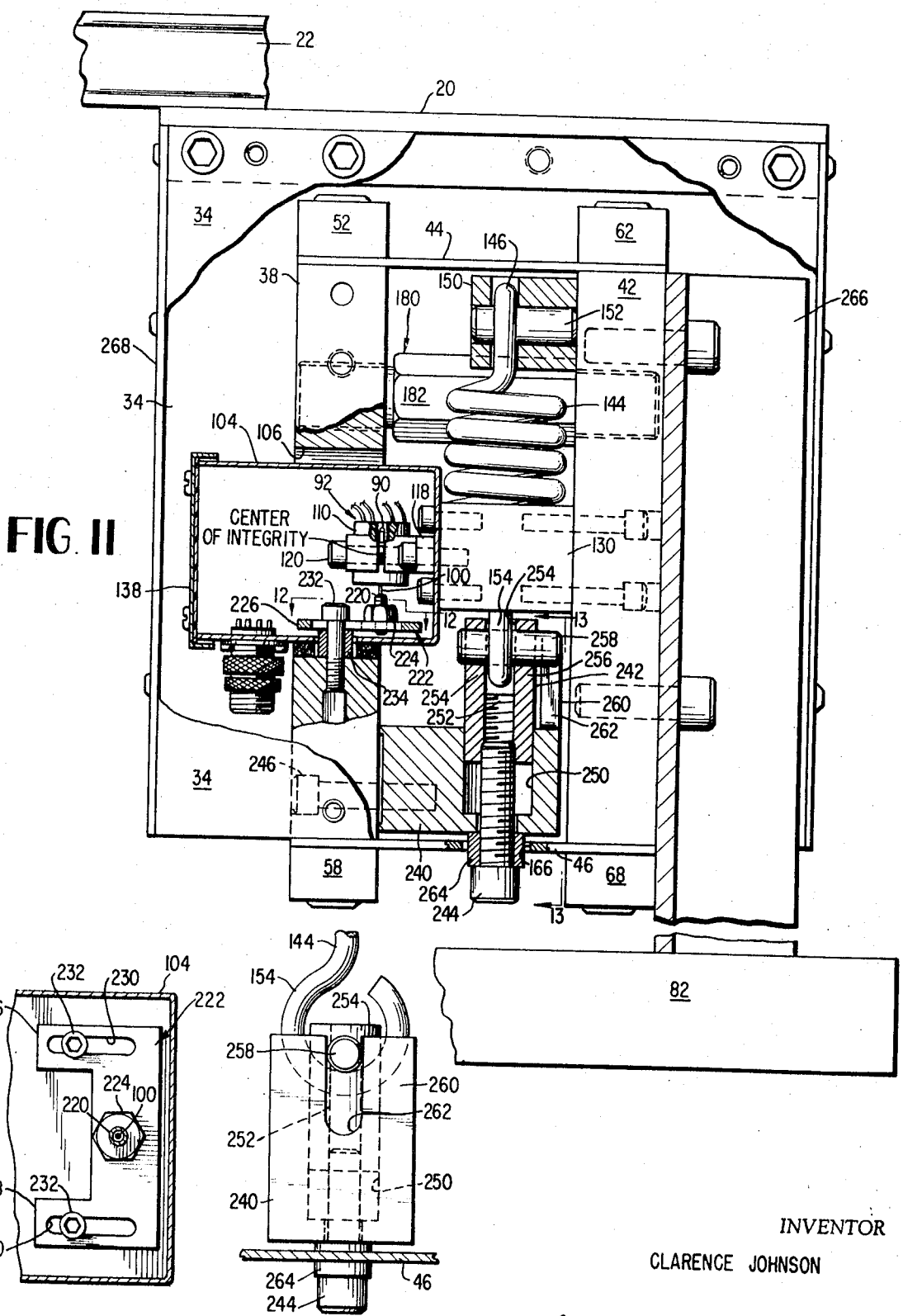

WEIGHING APPARATUS

FIELD OF INVENTION

This invention relates to weighing apparatus and more particularly to the type of weighing cell in which a load-receiving structure is supported for measurable, but relatively small vertical deflection by a plurality of cantilever-mounted flexure members.

Background

Conventional weighing cells of the type mentioned above customarily comprise a plurality of flexure members, such as leaf springs, that are cantilever-mounted in essentially parallel, vertically spaced apart relation on a fixed vertical support. The free ends of the flexure members are rigidly fixed to each other by a suitable structure to support the load-receiving structure. This interconnecting structure is effectively parallel to the spring-mounting support so that, in effect, a parallelogram frame is defined by the assembly of the flexure spring members, the support for the flexure spring members, and the structure that rigidly interconnects the free ends of the flexure members. With this parallelogram arrangement the parallel relation between the displaceable interconnecting structure at the free ends of the flexure members and the fixed support is generally maintained as the flexure spring members are flexed by application of a load to the load-receiving structure. Thus, under ideal conditions, essentially only vertical movement is imparted to the load receiving structure by the weight of the applied load, and the unitary deflection of the assembly of the load-receiving and interconnecting structures relative to the support is closely proportional to the weight of the applied load.

The deflection of the load-receiving structure is conventionally measured by a differential transformer having a fixed winding and a movable core that is connected by suitable motion transmitting means to one of the deflected parts. The transformer core is therefore displaced by a distance closely proportional to the displacement of the load-receiving structure to provide an output signal that is a weight-representing function of the weight of the applied load.

The foregoing type of weighing cell is described in U.S. Pat. Nos. 3,373,830; 3,371,526, and 2,809,519, among others, and in Russian Pat. No. 141,673.

Prior to this invention is was generally recognized that accurate weight measurements of off-center loads were not obtained with the relatively sensitive types of cantilevered flexure spring weighing cells in which the measured vertical deflection is very small, such as those requiring measurements in terms of ten-thousands of an inch. Off-center loading occurs when a load to be weighed is placed on the load-receiving structure at a region that is spaced by a lever arm distance from a plane in which the deflection-producing resultant force is effectively transmitted to the flexure spring assembly.

Some proposals have been made for generally improving the accuracy of prior cantilevered flexure spring weighing cells, but none have been satisfactory for producing accurate weight measurements with the highly sensitive, small deflection type of weighing cell, especially for measuring the weights of off-center loads.

SUMMARY AND OBJECTS OF INVENTION

A primary object of this invention is to provide for a novel cantilevered flexure spring type weighing cell which has a relatively small, measured deflection for accurately weighing off-center, as well as on-center loads. With this invention, the load may be located considerably off-center with respect to the weighing cell without impairing the accuracy of the weight measurements.

According to this invention, it was recognized that off-center loading placed the vertically spaced, load-supporting flexure springs respectively in tension and in compression. The compressed flexure spring will consequently buckle, while the tensioned flexure spring will stretch (see FIG. 9). Since flexure springs and other structural members have greater stability in tension than in compression, the magnitude of buckling is significantly greater than the magnitude of stretching.

As a result, the structure rigidly interconnecting the free ends of the flexure springs will turn or twist about a predetermined, essentially horizontal twist axis. This turning or twisting motion of the interconnecting structure will be relative to the support which mounts the flexure springs so that the interconnecting structure will no longer be ideally, effectively parallel to the flexure spring support.

For conventional cantilevered flexure spring weighing cells and particularly in such weighing cells that are constructed for weighing off-center loads, it was discovered herein that the turning or twisting of the interconnecting structure relative to the flexure spring support results in relative longitudinal, signal-varying motion between the transformer core and the transformer winding. In conventional weighing cells, this objectionable signal-varying motion occurs because the transformer winding is customarily fixed to the flexure spring support and the transformer core is usually fixed to the interconnecting structure at positions where relative longitudinal motion takes place between the transformer core and winding when the interconnecting structure at the free ends of the flexure springs is turned or twisted relative to the flexure spring support. As a result, an error is introduced into the transformer-produced weight-representing signal.

Furthermore, the tensioned flexure spring exerts a force that bends or distorts and/or tilts or cocks the flexure spring support on its base or support surface no matter how rigidly and sturdily the flexure spring support is fixed to its base or support surface, within practical, commercial limitations. This condition is greatly aggrevated by off-center loads which exert a horizontal force component that acts in a direction to bend and/or tilt the support forwardly and away from its base or support surface. The bending or tilting of the flexure spring support was found to further aggrevate the relative angular displacement between the plate structure at the free ends of the flexure springs and the flexure spring support, owing to the increased buckling of the compressed flexure spring. As a result, the further off-center the load is placed, the greater the error in the weight measurement.

While the foregoing relative turning motion of the interconnecting structure and the consequent relative movement between the transformer core and winding is very small, it is proportionately large with respect to the small weight-deflecting motion of the load-receiving structure in sensitive weighing cells in which the weight-representing deflection normally does not exceed, for example, several ten-thousands of an inch.

In further accordance with this invention, it was discovered that there is a critical location for measuring the weight-representing deflection of the structure that is deflected under the influence of an off-center load. It was found that the weight-representing deflection of the deflectible weight cell components at this critical location does not vary objectionably when the interconnecting structure (which may be a rigid plate in this invention) at the free ends of the flexure springs is unavoidably turned or angularly displaced relative to the flexure spring support by off-center loads. Thus by positioning the transformer at this location or by transferring the weight-representing deflection of the deflectible structure at this location to a remotely located transformer core or other transducer no more than negligible relative motion occurs between the transformer core and winding when the structure that is deflected by the applied load is turned or twisted relative to the flexure spring support.

The foregoing critical location is defined herein as the "center of integrity." It is located longitudinally in a plane that normally intersects the longitudinal flexure axes of the flexure springs and substantially passes through the flexure spring interfaces between the intermediate, flexed flexure spring portions and the free end portions of the flexure springs that are rigidly fixed to the interconnecting plate structure. This plane contains the resultant force that is applied by the load to the flexure springs. The center of integrity is substantially coincident with the twist axis about which the interconnecting plate structure is turned by the tensioning and buckling of the flexure springs. Laterally, the center of integrity is located in a vertical plane medially intersecting the flexure springs.

Some tolerance is usually allowable so that the location at which weight-representing deflection is measured may be closely adjacent to, but not necessarily coincident with the center of integrity. For example, reasonably accurate and usually satisfactory weight measurements may be obtained where the location at which weight-representing deflection is measured is spaced in any direction essentially one-fourth inch from the center of integrity. But beyond this tolerance region, the accuracy of the weight-measurement begins to rapidly and progressively decline. Thus, tolerance region containing the center of integrity and in which usually acceptable accuracy is attained is defined herein as the "region of integrity."

The region of integrity is particularly critical for off-center loading for the reasons previously considered. In some cantilevered flexure spring weighing cells where off-center loading is not present or is not a significant or critical factor contributing to objectionable inaccuracies in the weight measurements, the transformer core sometimes is conventionally a part of the rigid structure that rigidly interconnects the free ends of the flexure springs. This type of construction is shown, for example, in U.S. Pat. No. 2,809,519 and Russian Pat. No. 141,673. Owing to practical limits of the size that the transformer winding may be made, the size of the transformer core and consequently, the structural strength of the core is limited. As a result, transformer cores that are arranged to interconnect the free flexure spring ends would objectionably be stressed, distorted and twisted out of shape by off-centered, relatively heavy loads and by relatively stiff flexure springs which are utilized to achieve a comparatively minute weight-representing deflection. In practice, therefore, such conventional constructions are normally limited to applications in which off-center loading is not a significant factor and in which the deflection of the core is usually relatively large, As a result, the location of the transformer core becomes non-critical.

In this invention, the transformer core does not form a part of the load-supporting structure. Instead, it is mounted by a relatively fine, but sufficiently sitff wire on a sturdy, relatively thick plate structure that rigidly interconnects the free springs ends. The core itself is light weight and small as is the transformer winding assembly so that the transformer construction is highly sensitive to measure the minute weight-representing deflections mentioned above.

In addition, the core supporting wire which is made of hard drawn brass or other material having a similar thermal coefficient of expansion to thermally compensate for the temperature-induced variations of the modulus of elasticity of the flexure springs.

Owing to the capability of the weighing cell of this invention to accurately weigh off-center loads, significantly long weighing arms may be utilized to locate the weighing cell in a conveniently servicable area that is remote from the object or other load to be weighed.

In addition to the foregoing, other objects of this invention reside in a novel compact weigh cell construction, a convenient and easily accessible tare adjustment, a simplified temperature compensating construction, and a simplified stop for limiting displacement of the load-receiving platform and flexure of the load supporting flexure springs.

These and other objects will appear as the description proceeds in connection with the appended claims and the below-described drawings.

DESCRIPTION OF DRAWINGS

FIG. 1 is a plan view of the weighing apparatus embodying the principles of this invention;

FIG. 2 is a partially sectioned side elevation of the apparatus shown in FIG. 1 with one of the side mounting plates broken away to illustrate interior details;

FIG. 3 is a partially sectioned front elevation of the weighing apparatus shown in FIG. 1 with portions broken away to illustrate details of the differential transformer;

FIG. 5 is a section taken substantially along lines 5—5 of FIG. 3;

FIG. 6 is a section taken substantially along lines 6—6 of FIG. 3;

FIG. 11 is a section taken substantially along lines 11—11 of FIG. 10;

FIG. 12 is a section taken substantially along lines 12—12 of FIG. 11; and

FIG. 13 is a section taken substantially along lines 13—13 of FIG. 11.

DETAILED DESCRIPTION

Figure 4:
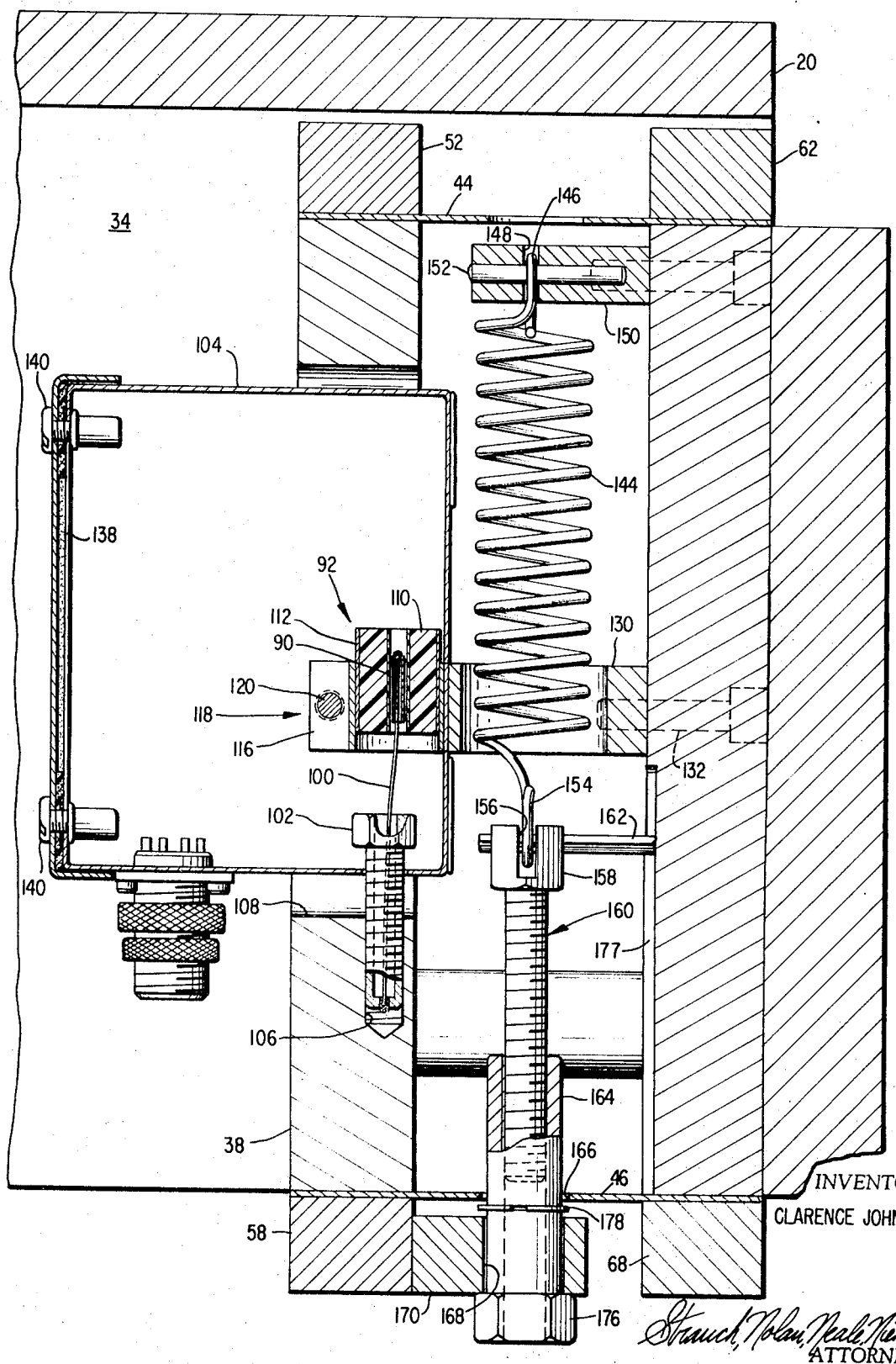
FIG. 4 is a section taken substantially along lines 4—4 of FIG. 3.

Referring to FIGS. 1–3, the weighing apparatus incorporating the principles of this invention comprises a load-supporting platform 20 in the form of a rectangular, flat sided, rigid plate. For certain weighing applications, a horizontal load-receiving weigh arm 22 is mounted on and rigidly fixed to platform 20 by machine screws 24 or other suitable means.

In this embodiment, weighing arm 22 is in the form of an I-beam that extends longitudinally of any beyond the forward edge of platform 20. This form of weigh arm is effective for receiving annular articles to be weighed, such as, for example, coils of wire. To weigh such articles, they are conveniently placed on the overhanging, free end of weigh arm 22 so that the weigh arm extends through the opening defined by the annular article as indicated at 26 in FIG. 2. Weigh arm 22 is parallel to and medially intersected by a vertical longitudinal plane extending medially of the illustrated weighing apparatus.

For other weighing applications, it will be appreciated that different forms of load-receiving structures may be mounted on platform 20 in place of weigh arm 22. For example, a flat, horizontal elongated platform (unshown) may rigidly be mounted on platform 20 to receive articles such as containers or the like. Such a container-receiving platform is conveniently longitudinally elongated so that it has a portion extending beyond platform 20 to provide a relatively large surface for receiving off-center loads.

Referring back to FIGS. 1–3, platform 20 is mounted on and rigidly fixed to a pair of parallel, spaced apart, flat-sided, side mounting plates 34 by machine screws 36. Screws 36 extend horizontally through side plate apertures and are threaded into tapped bores in side edge surfaces of platform 20. The upper edges of plates 34 are flush with the flat top of platform 20.

As best shown in FIG. 3, side plates 34 perpendicularly depend from platform 20 and are rigidly fixed to opposite sides of a rigid, flat-sided, rectangular relatively thick support plate 38 by machine screws 40. The oppositely facing edge surfaces of plate 38 are parallel and flat to mate with the opposing flat faces of side plates 34. As shown, support plate 38 is interfittingly received between side plates 34. Screws 40 extend horizontally through apertures in the side plates and are threaded into parallel, tapped bores that are formed in plate 38. Thus, platform 20 is supported on side plates 34, and side plates 34 are, in turn, supported by plate 38.

As shown in FIG. 2, support plate 38 is supported from another flat-sided rectangular support plate 42 by a flexure plate assembly comprising a pair of flat-sided, rectangular flexure spring plates 44 and 46. Flexure plates 44 and 46 are fabricated from suitable spring steel and are preferably identically dimensioned.

As shown in FIGS. 2–4, the forward end portion of flexure plate 44 extending across the entire width of the flexure plate 38 is firmly and interfittingly clamped between the upper flat edge surface of plate 38 and a rigid rectangular flat-faced, clamping block 52 by machine screws 54 which secure block 52 to plate 38. Each of the screws 54 extends through a smooth wall bore in block 52 and an aligned aperture in flexure plate 44 and is threaded into a tapped bore in the upper edge of support plate 38. Thus, by tightening screws 54 to seat against internal shoulders in block 52, the forward end portion of flexure plate 44 is securely clamped along its entire width between the opposing flat faces of support plate 38 and clamping block 52.

Still referring to FIGS. 2–4, the forward end portion of flexure plate 46 is similarly, firmly clamped along its entire width between the flat bottom edge surface of plate 38 and another flat-faced, rectangular clamping block 58 by machine screws 60 which secure block 58 to plate 38. Each of the screws 60 extends through a smooth walled bore in block 58 and an aligned aperture in plate 46 and is threaded into a tapped bore in the bottom edge of support plate 38. Thus, by tightening screws 60 to seat against internal shoulders in block 58, the forward end portion of flexure plate 46 is securely clamped between the opposed flat faces of support plate 38 and clamping block 58.

As best shown in FIG. 2, the rearward end portion of flexure plate 44 is firmly clamped along its entire width between the top, planer surface of support plate 42 and a flat-faced rectangular clamping block 62 by machine screws 64 which secure block 62 to plate 42. Each of the screws 64 extends through a smooth walled bore in block 62 and an aligned aperture in flexure plate 44 and is threaded into a tapped bore in the upper end of support plate 42. By tightening screws 64 to seat against internal shoulders in clamping block 62 the rearward end portion of flexure plate 44 is securely clamped between the opposing flat faces of plate 42 and block 62.

The rearward end portion of flexure plate 46 is correspondingly firmly clamped between the bottom flat face of support plate 42 and another clamping block 68 by screws 70 which secure block 68 to plate 42. Each of the screws 70 extend through a smooth walled bore in block 68 and an aligning aperture in flexure plate 46 and is threaded into a tapped bore in the bottom of support plate 42. Thus, by tightening screws 70 to seat against internal shoulders in clamping block 68, the rearward end portion of flexure plate 46 is securely clamped between the opposing flat faces of plate 42 and block 68. Support plates 38 and 42 are parallel and substantially vertical as shown.

Figure 7:
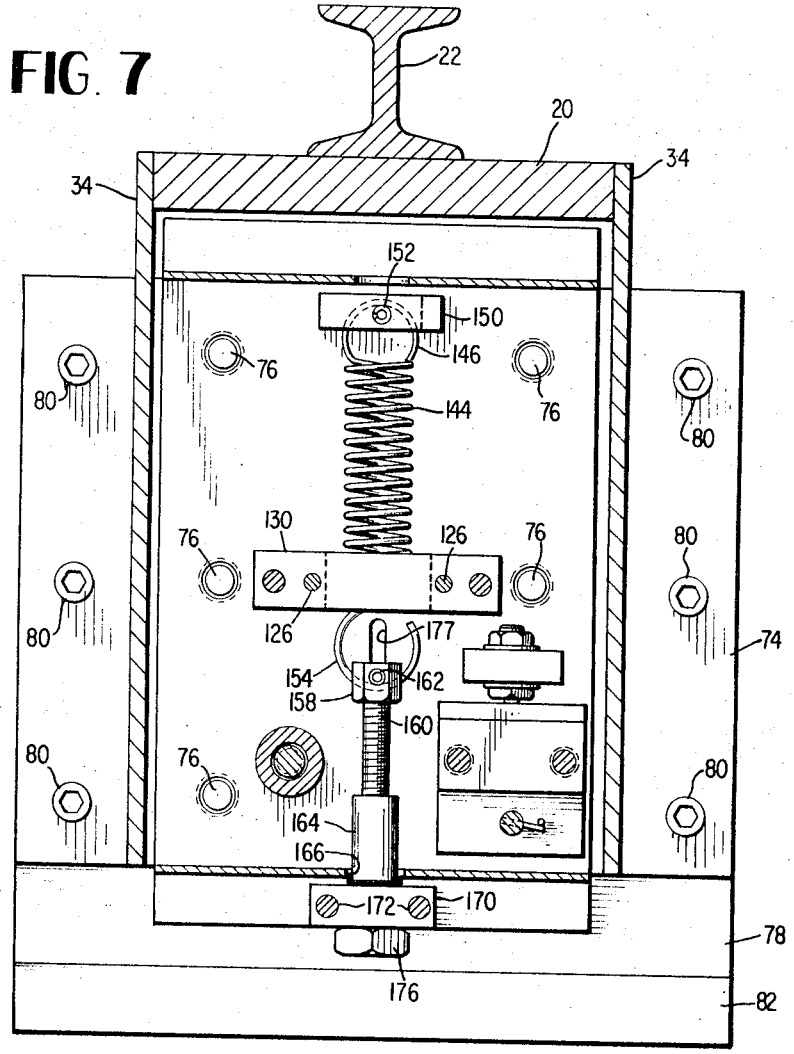
FIG. 7 is a fragmentary section taken substantially along lines 7—7 of FIG. 2.

Support plate 42, as best shown in FIGS. 2 and 7, is rigidly fixed to and supported from a flat-sided mounting plate 74 by machine screws 76. Mounting plate 74 is fixedly mounted on an upstanding, rigid, flat-sided support block 78 by machine screws 80 or the like, and support block 78 is fixed at its lower end on an elongated flat base plate 82 by screws 84 or other suitable means.

Base plate 82 may suitably be anchored to a floor or other support surface. Support block 78 extends vertically upwardly from base plate 82 as shown. The abutting flat sides of mounting plate 74 and support block 78 are vertical and parallel with the abutting flat sides of mounting plate 74 and support plate 42. These abutting flat sides are normal to the clamped portions of flexure plates 44 and 46.

From the foregoing description it is clear that flexure plates 44 and 46 are essentially in parallel, vertically spaced apart relation and are supported in cantilever fashion from support plate 42. The assembly of support plate 38, clamping blocks 52 and 58, side plates 34 and platform 20 is supported as a rigid unit from the free ends of flexure plates 44 and 46 so that the entire weight of a load applied to weigh arm 22 or other load-receiving structure on platform 20 will cause plates 44 and 46 to flex to provide for a substantially vertical and linear displacement of support plate 38 by a distance that is substantially proportional to the weight of the applied load. The displacement of plate 38 and the parts fixed thereto will be confined to a substantially vertical path owing to the parallelogram frame defined by plates 38, 42, 44 and 46. More particularly, a plane 89 (FIG. 9) extending perpendicularly of the longitudinal flexure plate axes at the free ends of the flexure plates and passing through the interfaces between the clamped free flexure plate ends and the intermediate unclamped flexure plate portions is substantially parallel to a plane 89a (FIG. 9) extending perpendicularly of the longitudinal flexure plate axes at the fixed or supported ends of the flexure plates and passing through the interfaces between the clamped stationary flexure plate ends and the intermediate unclamped flexure plate portions when flexure plates 44 and 46 are unflexed as shown in phantom lines in FIG. 9. Planes 89 or 89a contain the opposing flat faces of support plates 38 and 42 respectively. Planes 89 and 89a become slightly non-parallel as flexure plates 44 and 46 are flexed under an influence of an off-center load.

The clamped free end portions of flexure plates 44 and 46 are maintained in parallel planes that perpendicularly intersect plane 89. The clamped fixed or stationary ends of flexure plates 44 and 46 are maintained in parallel planes that perpendicularly intersect plane 89a. Plate 38 acts on a spacer between the free ends of flexure plates 44 and 46, and the assembly of plate 38 and clamping blocks 52 and 58 rigidly interconnect the free flexure plate ends. Similarly, plate 42 acts as a spacer between the fixed ends of flexure plates 44 and 46, and the assembly of plate 42 and clamping blocks 62 and 68 rigidly interconnect the fixed or stationary flexure plate ends.

As will be described in greater detail shortly, the substantially vertical motion of plate 38 is transmitted to proportionately displace a core 90 (see FIG. 4) in a linear variable differential transformer 92. Thus, the output circuit 94 (see FIG. 8) for transformer 92 will develop an electrical signal having an amplitude that is proportional to the weight of the load applied to weigh arm 22 or other load-receiving structure on platform 20. Support plate 38 will be displaced by an applied load along a path that is parallel to plane 89. Flexure plates 44 and 46, which are of identical construction have substantially the same spring rates and are relatively stiff so that relatively large loads will only cause a relatively minute, weight-representing vertical deflection of support plate 38 and core 90. For example, a 250 pound load may only vertically deflect plate 38 and core 90 0.01 inch.

With the foregoing type of cantilevered spring weighing apparatus, the application of a load 26 places the upper and lower flexure plates 44 and 46 respectively in tension and compression. As a result, plate 44 will stretch, and plate 46 will buckle. If the load is placed off center on the opposite side of plane 89, flexure plate 44 will be placed in compression and will consequently buckle, while flexure plate 46 will be tensioned and will consequently stretch. Since structural members, such as flexure plates 44 and 46, are less stable in compression than in tension, the extent to which the tensioned flexure plate is stretched will be less than the extent to which the compressed flexure plate is buckled. Support plate 38 will therefore turn or twist relatively to plate 42 about a substantially horizontal twist axis that was found to be located in plane 89. As a consequence of this angular displacement of plate 38 together with clamping blocks 52 and 58 and the clamped free flexure plate ends, plane 89 will become slightly non-parallel with respect to plane 89a as shown in full lines in FIG. 9. If the load is applied on center at plane 89, there is substantially only pure bending of flexure plates 44 and 46 without any significant stretching or buckling. Hence, on center loads applied in alignment with plane 89 will not result in the relative angular displacement of planes 89 and 89a as experienced with off-center loads.

Although the relative angular displacement between planes 89 and 89a, which is produced by off-center loads, is minute for relatively stiff flexure springs, it becomes critically significant and proportionately large in weighing cells where relatively minute weight-representing deflections are measured and represent relatively large weights and particularly where the load being weighed is off-center. A load spaced longitudinally from plane 89 will be off-center.

Figure 9:
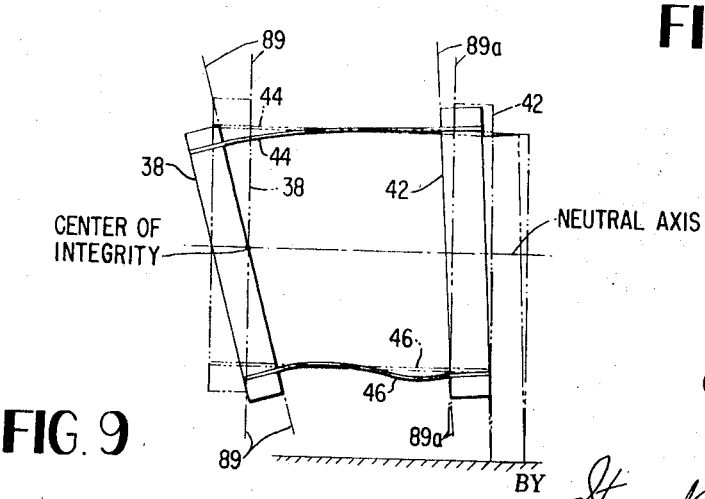
FIG. 9 is a generally diagrammatic side elevation of the weighing cell in which the unflexed positions of the springs are shown in phantom lines and in which the flexed positions are shown greatly exaggerated in solid lines.

Off-center loading results in a significant horizontal force component (especially for relatively heavy loads) since the resultant force exerted by an applied load will be parallel to plane 89 which has been angularly displaced from its unloaded vertical position. When the load is at 26, this horizontal force component together with the less stable compression condition of flexure plate 46 results in a significant force moment that is applied to support block 78. This force moment will cause support block 78 to slightly bend and/or tilt or cock away from the support surfaces as shown in FIG. 9, no matter how rigidly the flexure spring support is fixed to a support surface within practical limitations. This condition of bending and/or tilting of the flexure spring support aggravates the buckling of flexure plate 46, with the result that the angular displacement of plane 89 relative to plane 89a will be significantly increased.

In conventional cantilevered flexure spring weighing cells that are adapted to weigh off-center loads by measuring weight-representing deflections of relatively minute magnitude, the transformer core is so positioned that it will longitudinally be displaced relative to the transformer winding when plane 89 is angularly displaced relative to plane 89a. More particularly, the relative angular displacement of plane 89 will cause the transformer core to swing up or down relative to the transformer winding. As a result, a significant error will be introduced into the weight-representing output signal produced by the transformer or other transducer.

In accordance with this invention, it was found that when the transformer core and winding assembly is positioned in the region of integrity, no more than negligible relative longitudinal motion occurs between the transformer core and winding as a result of the angular displacement of plane 89 relative to plane 89a. More generally, it was found that by measuring the weight-representing deflection in the region of integrity no objectionable error is introduced into the transducer's weight-representing output signal by the unavoidable, relative angular displacement between planes 89 and 89a.

The previously defined center of integrity was found to lie in plane 89 and in two planes which perpendicularly intersect each other and also plane 89. One of the last-mentioned two perpendicular planes is substantially vertical and medially intersects flexure plates 44 and 46, and the other extends horizontal between flexure plates 44 and 46 and contains the neutral axis of the assembly of flexure plates 44 and 46. Where flexure plates 44 and 46 have the same spring rates, the neutral axis will lie equidistantly between flexure plates 44 and 46. If, however, the spring rates of flexure plates 44 and 46 are different then the center of integrity will be displaced vertically from a plane that is disposed equidistantly between flexure plates 44 and 46. More specifically, the spacing of the center of integrity vertically between flexure plates 44 and 46 will be inversely proportional to the spring rates of the springs so that it will lie proportionately closer to the stiffer spring. The center of integrity is substantially coincident with the twist axis about which plate 38 is angularly displaced relative to plate 42 as a result of respectively stretching and buckling plates 44 and 46.

The region of integrity contains those points that are spaced in any direction from the center of integrity. When weight-representing deflection is measured within the region of integrity, but not at the center of integrity no more than a negligible error is produced by the relative rotation between planes 89 and 89a. However, when the weight representing deflection is measured at a point lying outside the region of integrity, the error due to relative angular displacement between planes 89 and 89a objectionably increases rapidly and non-linearly as the point of measurement is moved further and further away from the region of integrity.

In the embodiment of FIGS. 1–8, the center of core 90 (i.e., a point on the longitudinal core axis disposed equidistantly between opposite ends of the core) is in the region of integrity and very closely adjacent to the center of integrity. In the embodiment shown in FIGS. 10–13, this center of core 90 is substantially coincident with the center of integrity. When the effective centers of core 90 and the transformer winding assembly 110, which coaxially receives core 90, are in the region of integrity, it was found that relative rotation between planes 89 and 89a does not result in any objectionable relative longitudinal motion between core 90 and winding assembly 110. Instead, core 90 will simply turn slightly about the twist axis without any objectionable relative longitudinal motion, and there is sufficient clearance in the core hole defined by winding assembly 110 to prevent the core from rubbing against the winding assembly. As a consequence, no objectionable errors are introduced into the transformer-produced, weight-representing signal by the relative angular displacement between planes 89 and 89a. In both embodiments, core 90 is shown to be in a substantially null position.

As shown in FIG. 4, core 90 comprises a tubular member through which a thin, but relatively stiff support wire 100 freely extends. The upper end of wire 100 is suitably soldered to the upper end of core 90. The lower end portion of wire 100 extending beyond core 90 passes freely through a small bore that is coaxially formed in a machine screw 102. The lower end of wire 100 is soldered to the lower end of screw 102. Wire 100 is sufficiently stiff to support core 90 on screw 102.

Screw 102 extends freely through an aperture in a conduit box 104 and is threaded into a tapped bore 106 that is formed in the bottom flat edge surface of a rectangular aperture 108. Aperture 108 is formed through support plate 38. Thus, core 90 is secured through wire 100 and screw 102 to plate 38 so that it will be displaced as a unit with plate 38. It will be appreciated, however, that core 90 does not form part of the structure for supporting or transmitting the force exerted by the applied load. Wire 100 is sufficiently flexible so that it can be bent to accommodate slight misalignments between core 90 and screw 102 as best shown in FIG. 4. The axis of bore 106 is substantially parallel to plane 89. Screw 102 provides an electrical zero adjustment as will be explained in detail later on.

Still referring to FIGS. 3 and 4, conduit box 104 houses transformer 92. Winding assembly 110, which is conventional, is received in a suitable canister 112. Winding assembly 110 coaxially receives core 90 in a conventional manner, and canister 112 is interfittingly clamped between split clamping jaws 114 and 116 of a mounting bracket 118. The free, split ends of jaws 114 and 116 are flexed to firmly grip canister 112 by a machine screw 120 which extends through a smooth walled bore in the free end of jaw 114 and is threaded into an aligned tapped bore in the free end of jaw 116. Thus, by threading screw 120 in so that its head seats against the side of jaw 114, the free ends of jaws 114 and 116 are drawn toward each other to tightly clamp the winding-mounting canister therebetween. The longitudinal axes of core 90 and winding assembly 110 are substantially parallel with plane 89.

At their ends opposite from screw 120, jaws 114 and 116 are integrally joined by a base plate portion 124. Machine screws 126 spaced on opposite sides of the assembly of jaws 114 and 116 extend through apertures in base plate portion 124 and through aligned apertures in conduit box 104 and are threaded in parallel tapped bores that are formed in the flat end surface of a mounting plate member 130.

As best shown in FIG. 3, conduit box 104 extends freely through aperture 108 and has a back wall that is seated against the opposing flat end face of plate member 130. Conduit box 104 is rigidly mounted on plate member 130 by machine screws 136 extending through spaced apertures in the back wall of box 104 and threaded into parallel, tapped bores in plate member 130.

Plate member 130 is disposed horizontally between support plates 38 and 42 and is rigidly fixed to support plate 42 by machine screws 132. Screws 132 extend through parallel smooth walled bores in plate 42 and are threaded into aligned, parallel, tapped bores in plate member 130. With this construction it is clear that the transformer winding assembly 110 is rigidly fixed to support plate 42 and that core 90 is secured to support plate 38. Thus, as plate 38 is substantially vertically displaced relative to plate 42 by a load applied to weigh arm 22, core 90 will substantially be vertically displaced coaxially in winding assembly 110 by an equal distance. Sufficient clearance is provided between plate member 130 and support plate 38 so that plate member 130 does not interfere with the displacement of support plate 38.

A cover plate 138 is detachably mounted on conduit box 104 by screws 140 to provide access to the interior of the conduit box.

Referring to FIGS. 4 and 7, a helically coiled tare adjustment spring 144 has a looped end portion 146 which extends into a slot 148 in a spring mounting block 150 and which is hooked over a pin 152. Pin 152 is fixed in bores that are formed in mounting block 150 opposite side of slot 148.

Spring 144 is disposed vertically between the opposing faces of support plate 38 and 42 and passes freely through an enlarged aperture in plate member 130. The lower end of spring 144 terminates in a looped portion 154. Looped portion 154 extends into a slot 156 that is diametrically cut in a head 158 of an elongated machine screw 160. Portion 154 is hooked over a rigid pin 162 which is received at one end in aligned, through bores that are formed diametrically in head 158 on opposite sides of and at right angles to slot 156. Thus spring 144 is anchored at opposite ends to block 150 and screw 160 respectively.

With continued reference to FIGS. 4 and 7, screw 160 is coaxially threaded into an internally threaded, rigid sleeve 164. Sleeve 164 extends freely through a smooth edged, circular aperture 166 that is formed in the intermediate flexure portion of flexure plate 46 between clamping blocks 58 and 68. The lower end of sleeve 164 interfittingly, coaxially and rotatably extends through a cylindrically smooth walled bore 168 that is formed through a rigid, rectangular, flat-faced, sleeve guide block 170. Block 170 is rigidly fixed to and supported from clamping block 58 by machine screws 172. Screws 172 extend through smooth walled parallel, spaced apart through bores in clamping block 58 and are threaded in aligning tapped bores in guide block 170.

Guide block 170 is positioned below flexure plate 46 and between clamping blocks 58 and 62. Sufficient clearance is provided between guide block 170 and flexure plate 46 so that guide block 170 does not interfere with the flexure of plate 46. As shown, guide block 170 is so mounted on clamping block 58 that the longitudinal axis of bore 168 aligns with the longitudinal axis of aperture 166 and with the longitudinal axis of spring 144. These aligned longitudinal axis normally intersect the axes of pins 162 and 152. The longitudinal axes of pins 162 and 152 are parallel and are contained in a common vertical plane which also contains the longitudinal axes of spring 144, screw 160, sleeve 164 and bore 168.

As shown in FIGS. 4 and 7, the lower end of sleeve 164 extending through and beyond bore 168 integrally terminates in an adjustment nut 176 which seats against the flat underside of guide block 170. Nut 176 cooperates with a retainer ring 178 to confine sleeve 164 against axial displacement relative to bore 168. Thus, by engaging nut 176, sleeve 164 may selectively be rotated in opposite directions to cause screw 160 to respectively be threaded into and out of the sleeve. As a result, screw 160 is selectively axially displaceable in either direction to selectively increase or decrease the tension in spring 144.

Spring 144 is in tension to apply a biasing force through screw 160 and sleeve 164 to yieldably urge nut 176 into seat engagement with the underside of block 170. As a result, the spring biasing force is transmitted through blocks 170 and 58 to urge the assembly of the interconnected free ends of flexure plates 44 and 46, support plate 38, platform 20 and weigh arm 22 vertically upwardly in opposition to forces acting to flex plates 44 and 46 downwardly. By rotating sleeve 164 in a direction to thread screw 160 into sleeve 164, the biasing force applied by spring 144 is increased. Conversely, by rotating sleeve 164 in the opposite direction to cause screw 160 to be threaded out of sleeve 164, this spring biasing force is decreased.

Pin 162 extends into and is slidable along a straight vertical groove 177 which is formed in support plate 42. The end of pin 162 received in groove 177 is engageable with the side walls of the groove to prevent spring 144 and screw 160 from turning as sleeve 164 is turned in either direction for adjusting the tension in the spring.

By rotating screw 102 in either direction core 90 is longitudinally adjusted in either direction relative to winding assembly 110 without effecting relative displacement between support plates 38 and 42. Thus, the longitudinal position of core 90 may be adjusted to provide a zero output signal in absence of a load on weigh arm 22.

In initially utilizing the adjustments provided by screw 102 and spring 144, the load-supporting structure comprising weigh arm 22, platform 20, and side plates 34 are preferably removed before initial adjustments are made. Spring 144 is then relaxed by rotating nut 176 so that plates 44 and 46 will be substantial straight, parallel and unflexed and that the angle between flexure plate 46 and plane 89 will substantially be 90°. Then screw 102 is rotated to longitudinally displace core 90 to a position where the transformer-produced, weight-representing output signal is zero. Thereafter plates 34, platform 20 and weigh arm 22 are mounted in place.

The weight of plates 34, platform 20, and weigh arm 22 will cause the intermediate, unclamped portions of flexure plates 44 and 46 to flex with the result that plate 38 will vertically deflect relative to plate 42. Core 90 will consequential be longitudinally displaced from its adjusted null position. Now, nut 176 is turned to tension spring 144 until the 90° angle between plane 89 and flexure plate 46 is restored. As a result, core 90 is restored to its null position to provide a zero output signal in preparation for receiving a load to be weighed.

If, in the course of adjusting the position of core 90 by turning screw 102, the effective center of core 90 is displaced beyond the region of integrity, it is necessary to relocate core 90 and winding assembly 110 and to again make the adjustments of core 90 and spring 144 in the manner described above.

Wire 100 is preferably made of hard drawn brass or other suitable material having a similar thermal coefficient of expansion to compensate for the temperature-induced variations in the modulus of elasticity of flexure plates 44 and 46. Wire 100 longitudinal expands and contracts as the temperature respectively increases and decreases to cause respective decreases and increases in the modulus of elasticity of the flexure plates. The expansion and contraction of wire 100 longitudinally displaces core 90 relative to winding assembly 110 to effectively compensate for the temperature-induced variations in the flexure spring modulus of elasticity. Objectionable variations in the transformer-produced, weight-representing output signal due to temperature variations are thereby avoided.

Referring now to FIG. 5, a mechanical stop 180 is provided for limiting downward, load-induced displacement of support plate 38 to ensure that flexure plates 44 and 46 are not flexed and thereby stressed beyond a certain level by overloading the weigh cell. Stop 180 comprises a cylindrically smooth walled sleeve 182 and a machine screw 184. One end of the sleeve 182 is freely received in a smooth walled bore 186 that is formed through plate 38 along a substantially horizontal axis. The opposite end of sleeve 182 is coaxially seated in a shallow, counterbored recess 188 that is formed in support plate 42 along an axis substantially aligning with that of bore 186. Sleeve 182 is positioned by recess 188 so that is substantially aligns with the longitudinal axis of bore 186. Screw 184 extends coaxially through sleeve 182 such that its head seats against a shoulder that is formed in sleeve 182 at the base of an enlarged counterbored recess 190. At its opposite end, screw 184 is threaded into a tapped bore that is formed in plate 42 along an axis aligning with recess 188.

From the foregoing mechanical stop construction it is clear that the assembly of sleeve 182 and screw 184 is secured to plate 42. Sleeve 182 is axially confined against movement on screw 184 by seating engagement with support plate 42 at one end and with the head of screw 184 at the other end. In the mounted position of sleeve 182, a small circumferential clearance is provided between sleeve 182 and the smooth wall of bore 186. Although this clearance is relatively small it is sufficient to allow the maximum expected deflection of support plate 38 and the parts supported thereon under the influence of a full scale load. This maximum deflection is, as previously mentioned, relatively small. When this maximum deflection is exceeded as by overloading the weighing cell, the bore defining wall of support plate 38 will butt against the periphery of sleeve 182 to prevent further deflection of support plate 38 and the parts supported thereon.

Referring now to FIG. 6, a damping device 200 is provided for damping the vertical deflection of support plate 38 and consequently of core 90. Damping device 200 may be of any suitable form such as those described in U.S. Pat. No. 3,354,710 issued to applicant on Nov. 28, 1967 for Force Measuring Instrument. As shown, damping device 200 essentially comprises a piston 202 that is slidably and coaxially received in a cylinder chamber 204. Cylinder chamber 204 is defined by a support block 206. Support block 206 is rigidly fixed to support plate 38 and is disposed between plates 38 and 42.

Still referring to FIG. 6, a vertically extending piston rod 210 is fixed to piston 202 and has an upper end which is suitably fixed to a rigid, horizontally extending arm 212. Arm 212 is rigidly fixed to support plate 42 by any suitable means such as machine screws. Damping device 200 may advantageously include a by-pass control valve 214. Valve 214 controls flow of damping fluid through a partially unshown fluid flow passage that communicates with both ends of the piston cylinder chamber on opposite sides of piston 202 to by-pass damping fluid around the piston. By adjusting valve 214 to increase or decrease the flow of damping fluid through this by-pass passage the response of the weigh cell to an applied load is respectively increased or decreased. Valve 214 is advantageously connected to a wheel or dial 216 that is manipulatable to adjust the valve.

It will be appreciated that the foregoing weighing cell construction together with the tare adjustment, mechanical stop and damping device constitutes an exceptionally compact arrangement that may be mounted in relatively small spaces.

Figure 8:
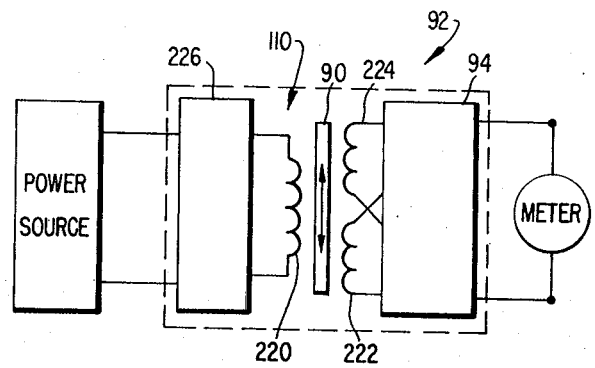
FIG. 8 is a schematic circuit diagram of the transformer shown in FIGS. 3 and 4.

As shown in FIG. 8, winding assembly 110 conventionally comprises a primary coil 220 and two secondary coils 222 and 224. Primary coil 220 is connected to a suitable source of alternating current such as a carrier oscillator 226. The secondary coils 222 and 224 are so connected that their output voltages are 180° out of phase. Displacement of core 90 alters the relative flux distribution between the primary and secondary coils so that motion of core 90 in one direction or the other results in an increased output of one phase or the other. The secondary output of transformer 92 is applied to circuit 94 which comprises a demodulator and filter network which develops an analog signal voltage having a magnitude proportional to the weight of the applied load. This analog output signal may be applied to an analog meter for a read-out or it may be converted by a suitable analog-to-digital converter into digital form, with the digitized signal being applied to a visual and/or printing apparatus that provides a digital read-out of the weight of the applied load.

In the modified embodiment shown in FIGS. 10-13 (where like reference numerals have been applied to designate like parts), the lower end of wire 100, instead of being fixed to screw 102, extends freely through a bore that is formed coaxially through an externally threaded pin 220 (see FIG. 11). The lower end of wire 100 is suitably soldered to the lower end of pin 220.

As best shown in FIG. 11, pin 220 is threaded into a tapped hole in an adjustable support bracket 222 and is locked in an adjusted position on bracket 222 by a lock nut 224.

Figure 10:
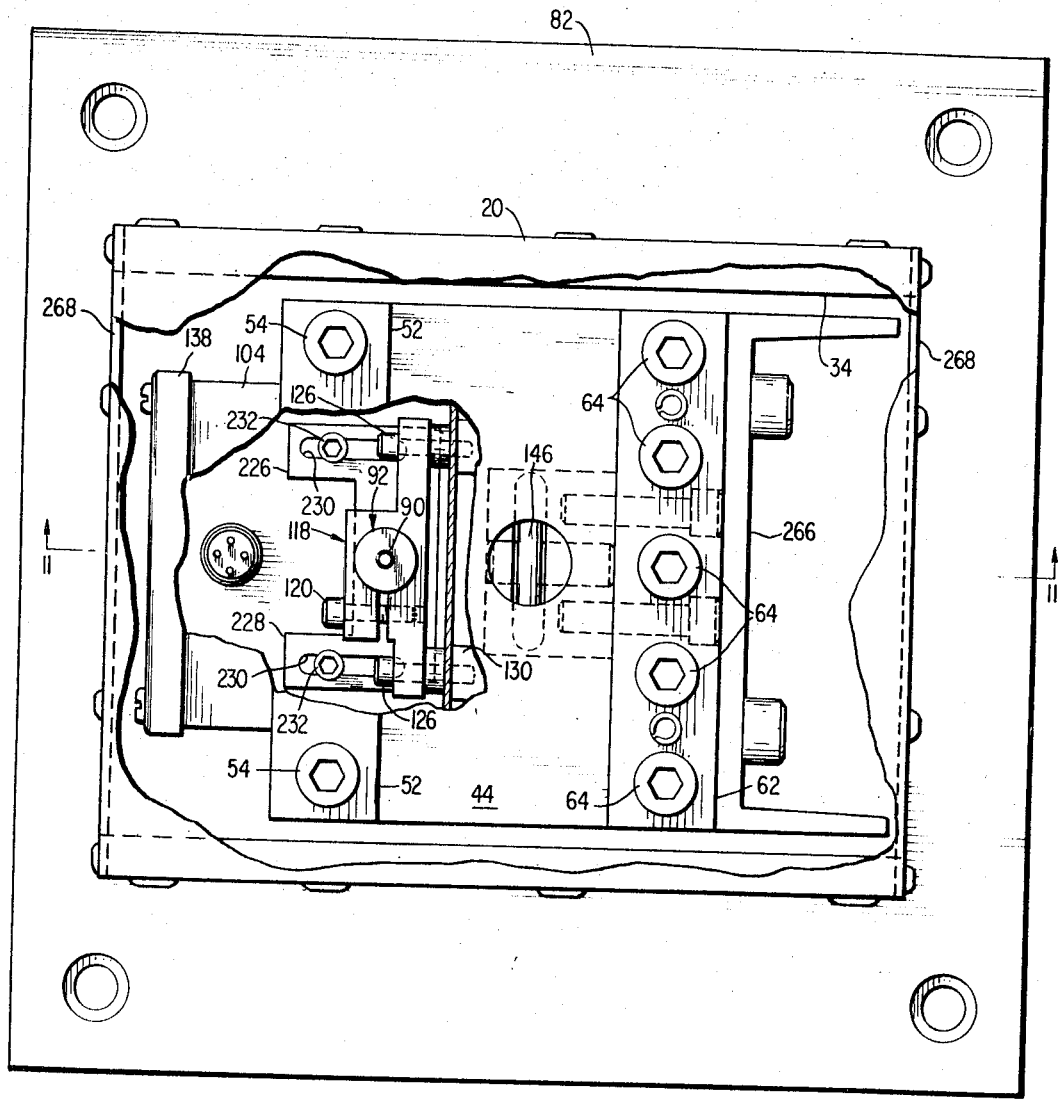
FIG. 10 is a top plan view of a modified form of this invention with portions broken away to show interior details.

Bracket 222, as shown in FIGS. 10-12, comprises a flat-sided plate having a pair of coextensive arm portions 226 and 228 that are integrally joined to each other by a cross portion that receiver pin 220. Arm portions 226 and 228 are formed with longitudinally elongated coextensive apertures 230 through which mounting screws 232 slidably and rotatably extend. Screws 232 are threaded into tapped bores that are formed in support plate 38 at the lower edge of aperture 106 The axes of the tapped bores receiving screws 232 are contained in parallel spaced apart planes that perpendicularly intersect plane 89. Thus, a plane containing the axes of screws 232 is spaced forwardly of a parallel plane containing the aligned axes of core 90, winding 100 and wire 100.

By loosening screws 232, bracket 222 may be slidably adjusted to accurately align wire 100 and core 90 with winding assembly 110 and with the center of integrity. By tightening screws 232, bracket 222 is rigidly clamped between the heads of screws 232 and spacer sleeves 234 through which screws 232 coaxially extend.

The longitudinal adjustment of core 90 is achieved by loosening lock nut 224 and by threading pin 220 in either direction to longitudinally displace core 90 in a corresponding direction. As shown, the aligned axes of pin 220, wire 100, core 90, and winding assembly 110 are contained in plane 89.

As shown in FIGS. 11 and 13, a modified tension-adjusting anchor is provided for spring 144 and comprises a mounting block 240, an internally threaded sleeve 242, and a adjusting screw 244. Mounting block 240 is disposed within the region delimited by plates 38, 42, 44 and 46 and is rigidly fixed to plate 38 by machine screws 246. Screws 246 extend through parallel, spaced apart, smooth walled bores in plate 38 and are threaded and aligning tapped bores in block 240.

Sleeve 242 has a cylindrically smooth outer periphery and is rotatably, slidably and interfittingly coaxially received in an upwardly opening cylindrically smooth walled bore 250. Bore 250 is formed in block 240 along an axis aligning with the longitudinal axis of spring 144 and extending parallel to plane 89.

The upper end of sleeve 242 is formed with a diametrical slot 252 to form a pair of parallel coextensive arm portions 254 and 256. Looped portion 154 of spring 144 extends into slot 252 and is hooked over a pin 258. Pin 258 is coaxially fixed at opposite ends in aligned bores that are formed through arm portions 254 and 256 along an axis normally intersecting the longitudinal axis of sleeve 242.

As best shown in FIG. 13, mounting block 240 is formed with an upstanding end wall 260 which is formed with a vertical, straight sided slot 262. One end of pin 258 is freely received in slot 262 and is buttable with one or the other of the straight parallel side edges of the slot to prevent sleeve 242 from rotating in bore 250 as it is axially displaced by threading screw 244 in one direction or the other.

As best shown in FIG. 11, screw 244 extends freely through aperture 166 and freely through an aligned diametrically reduced section of bore 250 and is threaded coaxially into sleeve 242. By threading screw 244 into sleeve 242, sleeve 242 is displaced axially downwardly to increase the tension in spring 144. By threading screw 244 in the opposite direction, sleeve 242 is displaced axially upwardly to reduce the tension in spring 144. As shown, screw 244 extends coaxially through an annular guide spacer 264 which is axially confined between the head of screw 244 and the flat bottom of mounting block 240.

In the embodiment of FIGS. 10–13, plate 42 is rigidly fixed to a rigid mounting plate 266 which replaces mounting plate 74 and support block 78. Plate 256 is rigidly fixed to and extends vertically upwardly from base 82.

Also, as shown in FIGS. 10 and 11, front and back cover plates 268 are advantageously fixed to platform 20 and side plates 34. Plates 268 depend from platform 20 and span the space between side plates 34. Platform 20 and plates 34 and 268 thus cooperate to define an open-bottom enclosure for housing the operative parts of the weighing cell as shown.

The invention may be embodied in other specific forms without departing from the spirit or essential characteristics thereof. The present embodiments are therefore to be considered in all respects as illustrative and not restrictive, and the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A weighing apparatus comprising relatively stationary rigid support means, a pair of flexure spring members mounted in cantilever fashion on said support means in vertically spaced essentially parallel relation, means rigidly interconnecting the free ends of said flexure members and maintaining said free ends in fixed spaced apart relation, a load-receiving structure supported by the free ends of said flexure members, said flexure members having intermediate portions that are free to be flexed by the weight of a load applied to said load-receiving structure to provide for a relatively small, essentially vertical displacement of the assembly of said load-receiving structure and said interconnecting means by a distance that is substantially proportional to the weight of the applied load, said load-receiving structure being adapted to receive a load at locations where it places said flexure members respectively in tension and in compression whereby said interconnecting means is angularly displaced a small distance relative to said support means and about a predetermined essentially horizontal axis, and transducer means comprising coacting, signal-producing parts respectively connected to said support means and said assembly of said load-receiving structure and said interconnecting means, said coacting signal-producing parts being relatively movable by the weight-representing displacement of the assembly of said load-receiving structure and said interconnecting means to measure the weight-representing displacement of said assembly at a predetermined location that is at least closely adjacent to a predetermined center of integrity where no signal-producing relative motion is imparted to said parts by the angular displacement of said interconnecting means relative to said support means.

2. The weighing apparatus defined in claim 1 wherein the signal-producing part connected to said assembly is carried by said assembly without supporting any part of the load applied to said load-receiving structure.

3. The weighing apparatus defined in claim 1 wherein each of said flexure members is a plate, wherein said interconnecting means firmly clasps each of the free ends of said flexure members between opposing surfaces to maintain said free ends in substantially parallel relation, and wherein said center of integrity is in a plane transversely intersecting the longitudinal flexure axes of said flexure members and passing through the interfaces between the clamped free flexure member ends and said intermediate portions that are flexed by application of a load to said load-receiving structure.

4. The weighing apparatus defined in claim 3 wherein said center of integrity is in a plane extending parallel to said flexure members and containing the neutral flexure axis of the assembly of said flexure members.

5. The weighing apparatus defined in claim 4 wherein said center of integrity is contained in a plane medially intersecting said flexure members.

6. The weighing apparatus defined in claim 3 wherein said center of integrity is substantially coincident with said horizontal axis.

7. The weighing apparatus defined in claim 3 wherein the signal producing part that is connected to said assembly is so mounted that it does not support any part of the load applied to said load-receiving structure.

8. The weighing apparatus defined in claim 7 wherein said signal producing parts are respectively fixed to and supported by said interconnecting means and said support means.

9. The weighing apparatus defined in claim 7 wherein said transducer comprises a transformer, and wherein said signal producing parts respectively comprise a transformer core and a transformer winding means respectively fixed to and supported by said interconnecting means and said support means, the displacement of said core relative to said winding means being effective to correspondingly vary an electrical signal that is supplied at an output of said winding means.

10. The weighing apparatus defined in claim 9 comprising a relatively thin wire mounting said core, and adjustment means fixing said wire to said interconnecting means and being manipulatable to selectively longitudinally adjust the position of said core relative to said winding to correspondingly vary said signal.

11. The weighing apparatus defined in claim 10 wherein said wire has a thermal coefficient of expansion that, in response to temperature changes, longitudinally varies the position of said core relative to said winding means by a magnitude sufficient to essentially compensate for temperature induced variations in the modulus of elasticity of said flexure members.

12. The weighing apparatus defined in claim 10 comprising spring means anchored to said support means and said interconnecting means for biasing said assembly and the free ends of said flexure members in a direction opposing the weight of a load applied to said load-receiving structure, and means for selectively adjusting the biasing force exerted by said spring means to thereby selectively vary the angle at which said plane intersects and each of said flexure members.

13. The weighing apparatus defined in claim 3 wherein said interconnecting means comprises rigid coacting clamping members defining said opposing surfaces and clamping each of said free ends along its entire width.

14. The weighing apparatus defined in claim 2 comprising stop means for limiting weight-representing displacement of said assembly to a relatively minute magnitude.

15. The weighing apparatus defined in claim 14 wherein said stop means comprises a sleeve, means coaxially received by said sleeve for fixing said sleeve to said support means, said sleeve extending between said support means and said interconnecting means and having one end received with a relatively small clearance in an opening in said interconnecting means, said interconnecting means being abuttable with said one end of said sleeve to limit the weight-representing displacement of assembly to said relatively minute magnitude.

16. A weighing apparatus for weighing off-center loads and comprising relatively rigid support means, a pair of flexure beam members mounted in cantilever fashion on said support means in vertically spaced apart essentially parallel relation, means rigidly interconnecting the free ends of said flexure members and maintaining said free ends in fixed parallel spaced apart relation, said interconnecting means including coacting structural members firmly clamping each of said free ends along substantially its entire width between opposing clamping surfaces, a load receiving structure mounted on said interconnecting means, with the assembly of said load receiving structure and said interconnecting means being supported for load-induced displacement only on the free ends of said flexure members, the intermediate portions of said flexure members extending between said free ends and the opposite flexure member ends that are mounted on said support means being free to be flexed by the weight of a load applied to said load-receiving structure to provide a relatively minute, essentially vertical weight-representing displacement of said assembly by a distance that is substantially proportional to the weight of the applied load, said load receiving structure being adapted to receive a load at off-center locations where it places said flexure members respectively in tension and in compression to cause said flexure members to respectively stretch and buckle, whereby said interconnecting means is angularly displaced a small distance relative to said support means and about an essentially horizontal axis, transducer means comprising first and second coacting signal-producing parts respectively connected to said assembly and said support means, said coacting signal producing parts being relatively movable by the weight-representing displacement of said assembly to measure the weight-representing displacement of said assembly at a predetermined location that is at least closely adjacent to a predetermined center of integrity where no signal-producing relative motion is imparted to said signal-producing parts by the angular displacement of said interconnecting means relative to said support means, said center of integrity lying in a plane that extends transversely of said flexure members and substantially passes through the interfaces between said free ends and said intermediate portions of said flexure members, and means so mounting said first signal-producing part that the load applied to said load-receiving structure is supported independently of said first signal-producing part.

17. The weighing apparatus defined in claim 16 wherein said first and second coacting signal-producing parts are respectively mounted on said interconnecting means and said support means, and wherein said interconnecting means is configured to at least partially receive said signal producing parts with sufficient clearance to provide for the relative weight representing motion between said signal-producing parts.

18. The weighing apparatus defined in claim 17 wherein one of said coacting structural members extends between the free ends of said flexure members and has an opening formed therein for at least partially receiving said signal-producing parts.

19. The weighing apparatus defined in claim 17 wherein said transducer comprises a transformer, and wherein said first and second signal producing parts respectively comprise a core and winding means coaxially receiving said core, the center of said core being at least closely adjacent to said center of integrity.

* * * * *